I. N. MONROE
Corn Coverer.

No. 108,717. Patented Oct. 25, 1870.

Witnesses
C. L. Puert
J. E. Hutchinson

Inventor
Isaac N. Monroe
per Alexander Mason
Atty.

UNITED STATES PATENT OFFICE.

ISAAC N. MONROE, OF BRIDGEPORT, ILLINOIS.

IMPROVEMENT IN CORN-COVERERS.

Specification forming part of Letters Patent No. 108,717, dated October 25, 1870.

*To all whom it may concern:*

Be it known that I, ISAAC N. MONROE, of Bridgeport, in the county of Lawrence, and in the State of Illinois, have invented certain new and useful Improvements in Corn-Coverers; and I do hereby declare that the following is a full, clear, and exact description thereof, reference being had to the accompanying drawings, and to the letters of reference marked thereon, making a part of this specification.

The nature of my invention consists in the construction and arrangement of a "corn-coverer," as will be hereinafter more fully set forth.

In order to enable others skilled in the art to which my invention appertains to make and use the same, I will now proceed to describe its construction and operation, referring to the annexed drawings, in which—

Figure 1:
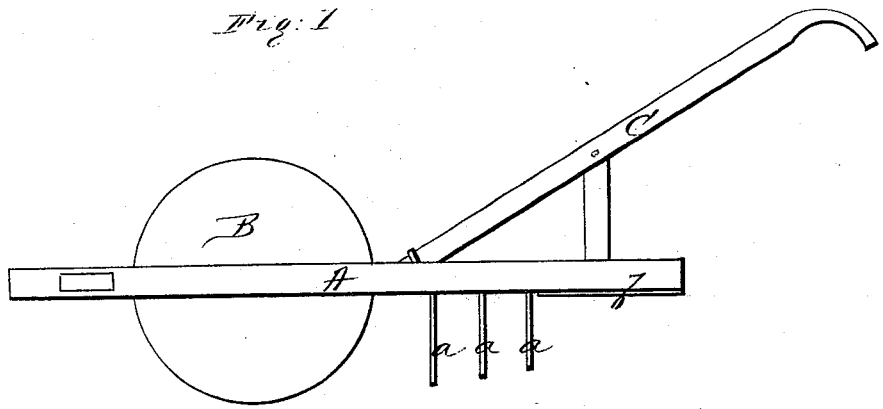
Figure 2:
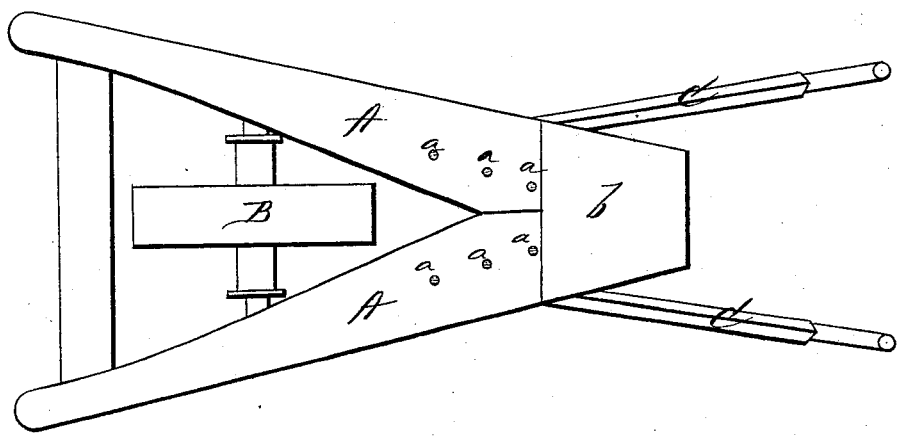

Figure 1 is a side view, and Fig. 2 is a bottom view, of my machine.

A represents an A-shaped frame, of any suitable dimensions, within which is mounted the roller B. In rear of this roller—that is, toward the narrower end of the frame, on the under side—are teeth *a a*, and at the rear end, on the under side, is secured an iron plate, *b*.

C C are handles attached in suitable manner to the frame A. When this machine is in operation, the teeth *a a* draw the dirt to the center, and fill the furrow and cover the corn. The iron plate *b* then passes over and breaks the clods and leaves the ground smooth.

Having thus fully described my invention, what I claim as new, and desire to secure by Letters Patent, is—

The arrangement of the A-shaped frame A, its widest portion being in front and suspending the roller B, and provided with obliquely-placed harrow-teeth *a a*, and scraper *b* on its rear, said scraper and rear part of the frame operating upon the earth while its front is elevated by the roller, as set forth, and for the purposes described.

In testimony that I claim the foregoing I have hereunto set my hand this 19th day of July, 1870.

ISAAC N. MONROE.

Witnesses:
GEORGE W. LEHR,
JACOB B. MONROE.